United States Patent
Krausa et al.

(10) Patent No.: US 12,050,060 B2
(45) Date of Patent: Jul. 30, 2024

(54) SCRAP DRYER AND/OR SCRAP PREHEATER

(71) Applicant: SMS group GmbH, Düsseldorf (DE)

(72) Inventors: Steffen Krausa, Pittsburgh, PA (US); William Todd Zeisler, Mars, PA (US); Paul Debski, Wilkinsburg, PA (US); Hans-Jürgen Odenthal, Mettmann (DE); Peter Starke, Duisburg (DE); Richard Cook, Pittsburgh, PA (US); Michael J. Kaltenbach, Newcastle, PA (US)

(73) Assignee: SMS group GmbH, Düsseldorf (DE)

( * ) Notice: Subject to any disclaimer, the term of this patent is extended or adjusted under 35 U.S.C. 154(b) by 0 days.

(21) Appl. No.: 17/814,916

(22) Filed: Jul. 26, 2022

(65) Prior Publication Data

US 2023/0030899 A1    Feb. 2, 2023

Related U.S. Application Data

(60) Provisional application No. 63/227,425, filed on Jul. 30, 2021.

(51) Int. Cl.
*F27D 13/00* (2006.01)
*F27D 9/00* (2006.01)
(Continued)

(52) U.S. Cl.
CPC ......... *F27D 13/002* (2013.01); *F27D 17/004* (2013.01); *F27D 99/0073* (2013.01); *F27D 2009/0075* (2013.01)

(58) Field of Classification Search
CPC .......... F27D 13/002; F27D 2009/0075; C21C 5/565
See application file for complete search history.

(56) References Cited

U.S. PATENT DOCUMENTS 4,373,911 A    2/1983  Date et al.
4,385,889 A *  5/1983  Yasukawa ............... C21C 5/565
                                                373/80

(Continued)

FOREIGN PATENT DOCUMENTS

DE    3133447 A1    4/1982
DE    3307400 C1    1/1984
(Continued)

OTHER PUBLICATIONS

DE-102018216652-A1 English translation (Year: 2020).*

(Continued)

*Primary Examiner* — Michael G Hoang
*Assistant Examiner* — Kurt J Wolford
(74) *Attorney, Agent, or Firm* — Smartpat PLC

(57) ABSTRACT

A device (1) for drying and/or preheating metallic and/or non-metallic materials, preferably scrap, comprises a receiving container (3) and a scrap basket (7) which is arranged in the receiving container (3) and has a gas-permeable bottom area (9). The receiving container (3) has at least one process gas inlet line (6) in its wall (4), via which a process gas with a temperature in the range from 200 to 1600° C. can be introduced into the receiving container (3), and at least an injector nozzle (19) arranged coaxially within the at least one process gas inlet line (6) via which a cooling gas can be introduced into the process gas.

17 Claims, 4 Drawing Sheets

(51) Int. Cl.
*F27D 17/00* (2006.01)
*F27D 99/00* (2010.01)

(56) References Cited

U.S. PATENT DOCUMENTS

| | | | |
|---|---|---|---|
| 4,666,402 A | | 5/1987 | Wilhelmsson |
| 5,026,240 A | * | 6/1991 | Kozierok ............ F27D 13/002 |
| | | | 432/143 |
| 5,106,063 A | | 4/1992 | Granstrom |
| 5,497,977 A | | 3/1996 | Schneider |
| 6,163,561 A | | 12/2000 | Benedetti et al. |

FOREIGN PATENT DOCUMENTS

| | | | |
|---|---|---|---|
| DE | 8437922 | | 10/1987 |
| DE | 102018216652 A1 | * | 4/2020 |
| DE | 102018216652 A1 | | 4/2020 |
| EP | 0359808 A1 | | 3/1990 |
| EP | 0636698 A1 | | 2/1995 |
| EP | 0970255 A1 | | 1/2000 |

OTHER PUBLICATIONS

Besagni et al., CFD sudy of ejector flow behavior in a Blast Furnace Gas galvanizing plant (Year: 2015).*
Besagni et al., Google Byline Date (Year: 2015).*
Trivellato et al., The post-combustion chamber of steelmaking plants Role of ambient air in reactant exhaust fumes (Year: 2014).*
Thekdi et al., Preliminary Results from Electric Arc Furnace Off-Gas Enthalpy Modeling (Year: 2021).*
Thekdi et al., Wayback Machine (Year: 2021).*
Surface Combustion, Ferrous Scrap Preheating System (Year: 1996).*
Yang, Present Situation and Prospect of EAF Gas Waste Heat Utilization Technology (Year: 2018).*

* cited by examiner

SCRAP DRYER AND/OR SCRAP PREHEATER

TECHNICAL FIELD

The present disclosure relates to a device for drying and/or preheating metallic and/or non-metallic materials, preferably scrap, to a method for drying and/or preheating metallic and/or non-metallic materials, preferably scrap, and to a metallurgical plant, preferably for the production of molten metallic products.

BACKGROUND

Devices for drying and/or preheating scrap are generally known from the prior art and are used on the one hand for energy recovery by using hot process waste gases that are produced during a melting process to preheat a batch of scrap that is to be melted. Furthermore, such devices are used to remove water, in particular snow and/or ice, from the batch of scrap metal to be melted, in order to minimize the risk of water vapor explosions during the melting process and thus make operation safer.

Various designs of such devices are known from the prior art.

For example, German patent specification DE 33 07 400 C1 discloses a scrap preheating stand which comprises a scrap basket which is open on one side and has a permeable base. The scrap preheating stand comprises a vertically movable, stationary hood, which is connected to a post-combustion chamber via a process gas line and via which the scrap basket that has been moved into the scrap preheating stand can be closed.

Furthermore, a scrap drying and scrap preheating device is known from German patent application publication DE 10 2018 216 652 A1, which comprises a scrap basket with a gas-permeable base area and a receptacle for the scrap basket. The receptacle has a support for receiving the bottom area of the scrap basket and encloses a gas supply space for a process gas. The scrap basket and the receptacle can be sealed off from the environment using a cover.

Another scrap drying device is known from U.S. Pat. No. 4,666,402 A, which has a scrap basket arranged in a preheating chamber. The scrap basket is sealed here by means of a hood that includes a process gas line for hot process gas. Furthermore, the hood has a cover plate, via which the preheating chamber can be sealed off from the environment. For this purpose, the cover plate comprises a vertically extending ring element which is arranged on the circumference and which is immersed in a water pit.

Other scrap baskets known from the prior art, with which scrap can be preheated by means of process gases, are also known from the publications EP 0 970 255 B1, EP 0 636 698 B1, EP 0 359 808 B1 and DE 31 33 447 A1.

The hot process gases, which usually have a temperature of 200 to 1600° C., usually cannot be conveyed using conventional conveying devices such as a blower, a compressor or a pump, since the high temperatures can damage and wear out the corresponding devices after a short time. On the other hand, the hot process gases usually have to be cooled in order to avoid exceeding the permissible operating temperatures of the mechanical and electronic components installed in such a device.

SUMMARY

The present disclosure provides a device for drying and/or preheating metallic and/or non-metallic materials that is improved compared to the prior art and a method for drying and/or preheating metallic and/or non-metallic materials by means of a process gas that is improved compared to the prior art. In a further aspect, the present disclosure provides a metallurgical plant which is improved over the prior art, preferably for the production of molten metallic products.

The device comprises a receiving container and a scrap basket arranged in the receiving container, which has a gas-permeable bottom area. The receiving container has at least one process gas inlet line extending through its wall, via which a process gas with a temperature in the range of 200 to 1600° C., preferably with a temperature in the range of 400 to 1200° C., more preferably at a temperature in the range of 600 to 1200° C. can be introduced into the receiving container. At least one injector nozzle is coaxially arranged within the at least one process gas inlet line, via which a cooling gas can be introduced into the process gas.

In a method for drying and/or preheating metallic and/or non-metallic materials, preferably scrap, a process gas is fed to the device via a process gas inlet line. A cooling gas, via which the temperature of the process gas can be regulated, is admixed to the process gas via at least one injector nozzle arranged coaxially in the at least one process gas inlet line.

A cooling gas, preferably air or an inert gas, can be mixed with the process gas via the at least one injector nozzle arranged coaxially within the at least one process gas inlet line in order to lower the temperature of the process gas into a range of 150 to 600° C., preferably up to a maximum of 350° C. The mixing principle between the hot process gas and the cold cooling gas consists in utilizing the speed gradient between the fast cooling gas flow and the slow process gas flow. Here, it is assumed that an unstable, free shear layer forms between the two flow layers, which tends to roll up and thus form vortices. These vortices are usually non-stationary, highly turbulent and increase in size on their way downstream through the process gas inlet line, as a result of which the hot process gas is increasingly mixed into the cold cooling gas core jet. The process gas, which is then diluted and cooled, flows via the process gas inlet line into the receiving container, in which it then flows through the scrap basket.

The device and the corresponding method thus enable a targeted adaptation of the operating parameters and prevent the permissible operating temperatures of the mechanical and electrical components of the device from being exceeded. If necessary, environmental conditions such as weather and/or precipitation data, air humidity, temperature and/or combinations thereof can also be taken into account in order to ensure an optimized drying and/or preheating process under all conditions.

In an advantageous embodiment variant, the at least one injector nozzle is fluidically connected via a cooling gas line to a cooling gas conveying device, in particular a blower. The cooling gas, for example ambient air, is sucked in via this and introduced coaxially into the hot process gas via the at least one injector nozzle. The cooling gas conveying device can be designed as an axial or radial fan and/or as a side channel compressor.

The at least one injector nozzle can preferably be designed as a subsonic nozzle or alternatively as a supersonic nozzle. In an advantageous embodiment variant, the injector nozzle can be made of a metallic material or of a temperature-resistant refractory mass, preferably with a thin steel armor.

Basically, a high mass flow and a high temperature of the diluted and cooled process gas are more efficient for drying and/or preheating. However, the process gas diluted in this way should not fall below a temperature of 150° C. and not exceed a temperature of 600° C. The outlet opening of the at least one injector nozzle is therefore designed in such a way that a high volume flow of the hot process gas at a high temperature is sucked into the cold cooling gas jet. This is preferably achieved by a specific diameter ratio of the outlet opening of the injector nozzle to the inside diameter of the process gas inlet line and by a specific speed ratio of the process gas to the cooling gas.

In one development, the at least one process gas inlet line can have at least one cooling section, such as a water-cooled cooling jacket, in order to even more precisely regulate the temperature of the process gas required for the drying and/or preheating process.

The gas-permeable bottom area of the scrap basket is preferably arched and comprises a plurality of slots on the circumference, through which the process gas can be introduced into the scrap basket. The circumferential slots can advantageously be formed by an arrangement of stacked metal sheets. It is particularly advantageously provided that the metal sheets are arranged inclined in relation to a horizontal line, so that on the one hand the condensed water can better flow off and on the other hand smaller scrap fractions jam less.

In order to remove the water that has condensed during the drying and/or preheating process from the scrap basket, it is advantageously provided that the receiving container and/or the scrap basket itself has an annular support on which the scrap basket can be placed. In this context, it is particularly preferred that the receiving container comprises a water pipe arranged below the support, via which the condensed water then occurring can be discharged.

The at least one process gas inlet line is preferably arranged in a lower area of the wall. The result of this is that the hot process gas supplied to the receiving container can be guided through the scrap basket from below.

For efficient sealing of the scrap basket arranged in the receiving container, it is preferably provided that the scrap basket has a flange with a sealing collar on its outer lateral surface, which collar corresponds to a sealing seat of the receiving container. The sealing collar can preferably be an annular metal sheet which extends vertically from the flange and which dips into the sand-filled sealing seat, which is preferably designed as an annular channel.

The process gas flowing through the scrap basket during the drying and/or preheating process can be sucked off via a cover element and/or a hood, which preferably includes a process gas outlet line. In an advantageous embodiment variant, the cover element and/or the hood can also be designed to be lockable to the scrap basket and/or the receiving container.

In a further, more preferred embodiment variant, the cover element and/or the hood can only be lowered over the receiving container and/or over the scrap basket and positioned in such a way that ambient air is sucked in as well. Since blowers which are also arranged in the process gas outlet line are usually used for this purpose, this means that they are less heavily loaded.

According to a further aspect, a hood that can be lowered above the scrap basket and through which the process gas can be discharged again.

In a further aspect, the present disclosure also relates to a metallurgical plant, preferably for the production of molten metallic products, in particular steel, comprising a melting unit, preferably an electrically operated melting unit, such as an electric arc furnace (EAF), a post-combustion chamber fluidically connected to the melting unit via a process gas exhaust line, and the device, which is fluidically connected to the post-combustion chamber via the process gas inlet line.

The following detailed description is merely exemplary in nature and is not intended to limit the invention or the application and uses of the invention. Furthermore, there is no intention to be bound by any theory presented in the preceding background or the following detailed description.

DETAILED DESCRIPTION

Figure 1:
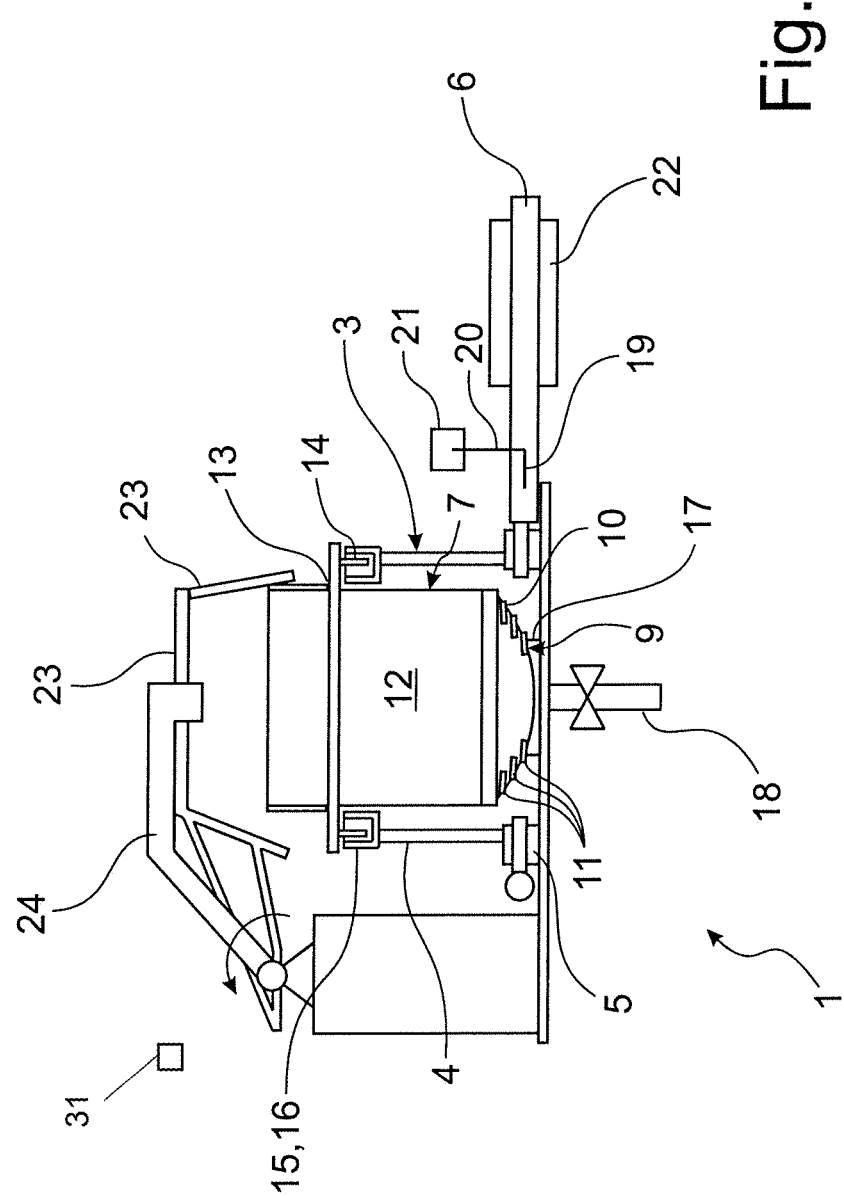
FIG. 1 shows an example of a device for drying and/or preheating metal scrap.
Figure 2A:
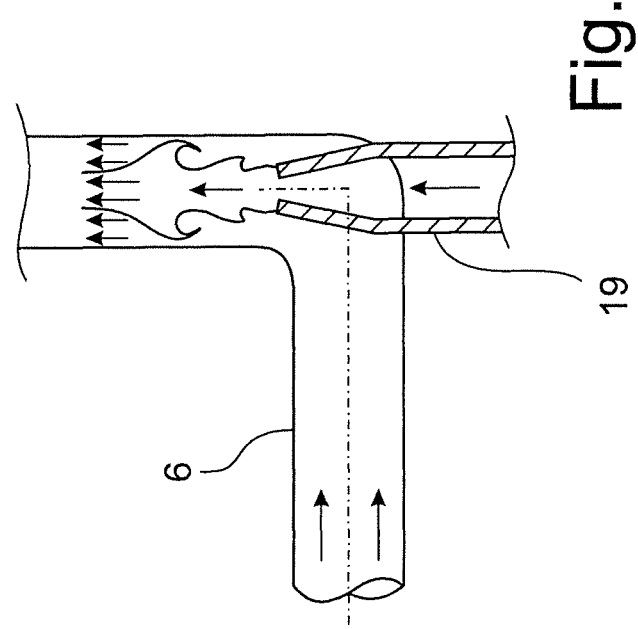
FIG. 2a shows a first exemplary arrangement of an injector nozzle in a process gas inlet line.
Figure 2B:
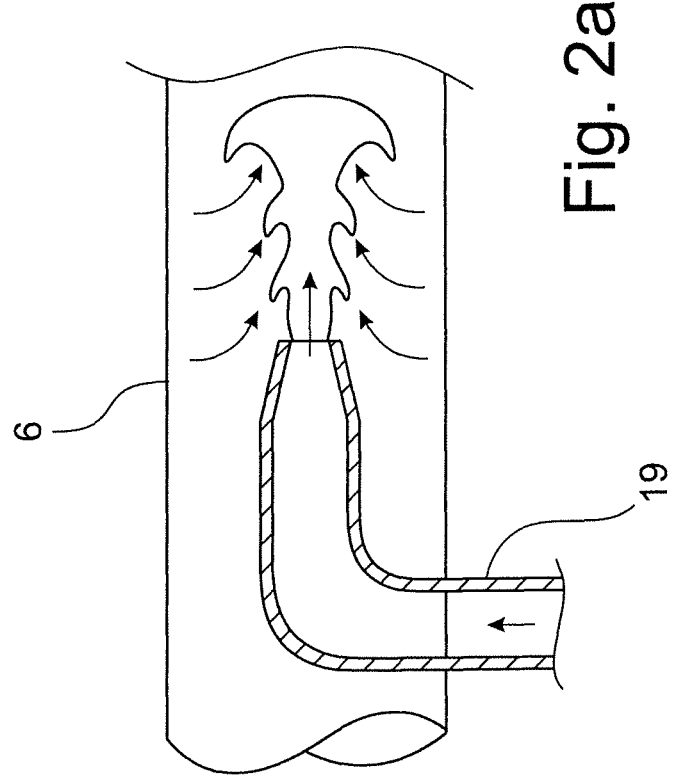
FIG. 2b shows a second exemplary arrangement of an injector nozzle in a process gas inlet line.
Figure 4:
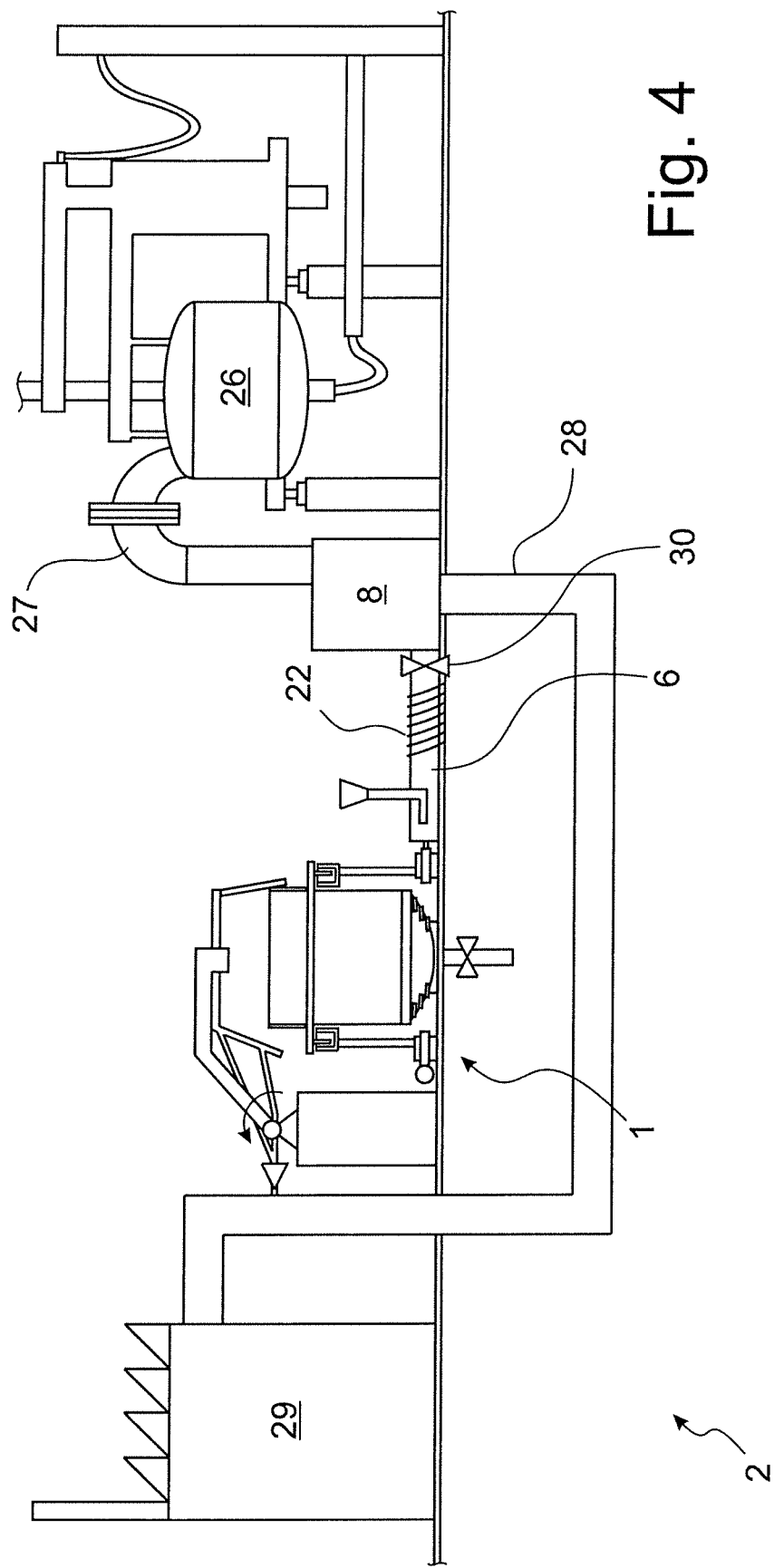
FIG. 4 shows an embodiment variant of a metallurgical plant for the production of molten metallic products containing the device shown in FIG. 1 or FIG. 3.

FIG. 1 shows a schematic representation of an embodiment of a device 1 for drying and/or preheating of metallic material, such as steel scrap, aluminum scrap, copper scrap, electronic scrap, which can form part of a metallurgical plant 2 for the production of molten products from the aforementioned scrap (see FIG. 4). However, the field of application of the device 1 shown here is not limited to this, but can also be used in the same way for drying and/or preheating sponge iron or other non-ferrous metals, such as scrap containing copper, or non-metallic materials such as glasses, etc.

The device 1 comprises a receiving container 3 which, in the present case, has a hollow-cylindrical wall 4 which rests on a foundation 5. A process gas inlet line 6 is arranged in the lower region of the wall 4 and extends through the foundation 5 into the interior of the receiving container 3 and opens into the receiving container 3. A process gas with a temperature in the range of 600 to 1200° C. is fed to the receiving container 3 via the process gas inlet line 6, via which the scrap (not shown) present in a scrap basket 7 can be dried and/or preheated. In order to be able to feed the process gas into the receiving container 3 as homogeneously as possible, the process gas inlet line 6 can preferably comprise a horizontal ring line which has a number of connections via which the process gas is then fed to the receiving container 3. At its end opposite to the receiving container 3, the process gas inlet line 6 can be connected to a post-combustion chamber 8 (see FIG. 3) or alternatively to a device for producing a process gas (not shown). Such a device can, for example, be a furnace and comprise a chamber with burners arranged therein.

The scrap basket 7 arranged in the receiving container 3 has a gas-permeable bottom area 9 which is arched in the present embodiment variant and comprises a plurality of slots 10 on the circumference, through which the hot process gas can be introduced into the scrap basket 7. The circumferential slots 10 are formed by a cascade of stacked sheets 11 which are vertically spaced apart by a specific distance (see FIGS. 1 and 3) and may be inclined by up to 30° with respect to a horizontal.

As can also be seen from the representation in FIG. 1, the scrap basket 7 has on its outer lateral surface 12 in the upper area a flange 13 with a sealing collar 14, which is in the form of an annular metal sheet that extends vertically from the lower side of the flange 13. The sealing collar 14 embodied in the form of the annular metal sheet corresponds here to a sealing seat 15 of the receiving container 3, which is embodied in the form of an annular channel 16 and can be filled with sand, for example.

Furthermore, the receiving container 3 comprises a support 17, on which the scrap basket 7 can be placed inside the receiving container 3, and a water pipe 18 arranged below the support 17, via which the condensed water that accumulates during a drying process can be removed from the scrap basket 7.

In order to regulate the temperature of the hot process gas and to dilute it to such an extent that the permissible operating parameters of the mechanical and electrical components of the device 1 are not exceeded, the device 1 shown in the present embodiment variant comprises a coaxially arranged injector nozzle 19 designed as a subsonic nozzle, via which a cooling gas can be introduced into the process gas. In this case, the injector nozzle 19 is fluidly connected via a cooling gas line 20 to a blower 21, via which air can be mixed with the hot process gas as cooling gas. Furthermore, the process gas inlet line 6 includes a water-cooled cooling jacket 22, via which the temperature of the process gas required for the drying and/or preheating process can also be regulated.

In the present embodiment variant, the process gas flowing through the scrap basket 7 during the drying and/or preheating process is sucked off via a hood 23 arranged above the scrap basket 7, which is fluidically connected to a process gas outlet line 24, which in turn has a blower 31. It can be seen here that the hood 23 is positioned above the receiving container 3, in particular above the scrap basket 7, in such a way that the ambient air can also be sucked in.

Figure 3:
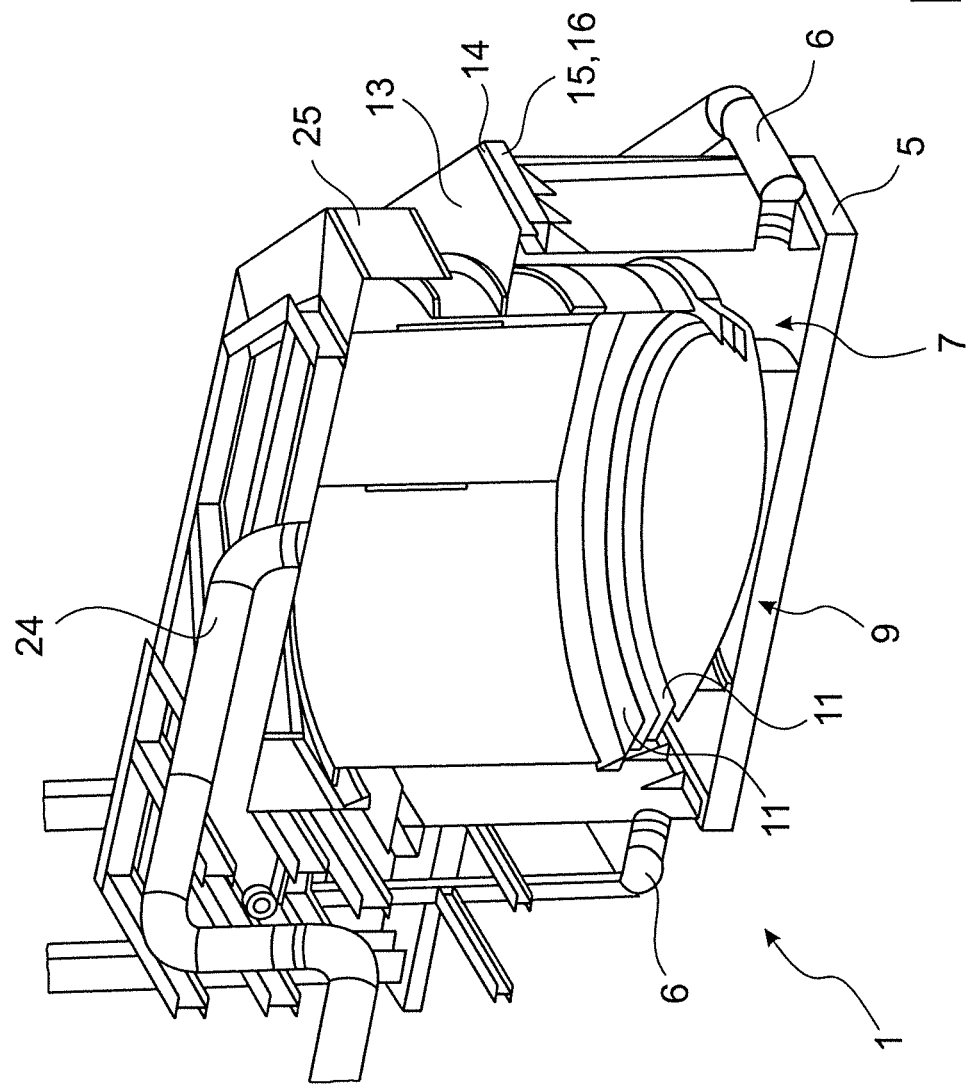
FIG. 3 shows a part of a further embodiment of the device in a sectional view.

FIG. 3 shows another embodiment variant of the device 1 in a sectional representation, which, in contrast to the embodiment variant shown in FIG. 1, has a cover element 25, via which the scrap basket 7 can be closed, but in such a way that ambient air can continue to be sucked in.

FIG. 4 shows an embodiment variant of a metallurgical plant 2 for the production of molten metallic products. The plant 2 comprises a melting unit 26, for example an electric arc furnace (EAF), a post-combustion chamber 8 fluidically connected to the melting unit 26 via a process gas exhaust line 27, and the device 1, which is fluidly connected to the post-combustion chamber 8 via the process gas inlet line 6. It can also be seen that the post-combustion chamber 8 is fluidically connected to a process gas main line 28. The major part of the process gas from the post-combustion chamber 8 is fed to a treatment plant 29 via the process gas main line 28. If a batch of scrap metal has to be preheated and/or dried, a partial volume flow of the process gas from the post-combustion chamber 8 can be fed to the device 1 via a valve 30.

While the present invention has been described with reference to exemplary embodiments, it will be readily apparent to those skilled in the art that the invention is not limited to the disclosed or illustrated embodiments but, on the contrary, is intended to cover numerous other modifications, substitutions, variations and broad equivalent arrangements that are included within the spirit and scope of the following claims.

The words "example" and "exemplary" as used herein mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, "A or B" refers to any of "A alone," "B alone," and "both A and B" unless specified otherwise or clear from context. The articles "a" and "an" as used in this application should generally be construed to mean "one or more" unless specified otherwise or clear from context to be directed to a singular form.

REFERENCE SIGNS 1 device
2 plant
3 receiving container
4 wall
5 foundation
6 process gas inlet line
7 scrap basket
8 post-combustion chamber
9 bottom area
10 slots
11 sheets
12 outer surface
13 element
14 sealing collar
15 sealing seat
16 channel
17 support
18 water pipe
19 injector nozzle
20 cooling gas line
21 blower
22 cooling jacket
23 hood
24 process gas outlet line
25 cover element
26 melting unit
27 process gas exhaust line
28 process gas main line
29 treatment plant
30 valve
31 blower

What is claimed is:

1. A device (1) for drying and/or preheating scrap, comprising:
a receiving container (3);
a scrap basket (7) arranged in the receiving container (3), the scrap basket (7) having a gas-permeable bottom area (9),
a process gas inlet line (6) that extends through a wall (4) of the receiving container (3) and via which a process gas can be introduced into the receiving container (3);
an injector nozzle (19) arranged coaxially within the process gas inlet line (6);
a cover element (25) or a hood (23) fluidically connected to a process gas outlet line (24); and
an outlet line blower (31) arranged in the process gas outlet line (24),
wherein a cooling gas can be introduced into the process gas via the injector nozzle (19), and
wherein a temperature of the process gas upstream of the injector nozzle (19) is in a range from 200 to 1600° C., and
wherein a temperature of the process gas downstream of the injector nozzle (19) is lower than 600° C., and wherein the process gas flowing through the scrap basket (7) and ambient air are sucked off via the cover element (25) or the hood (23) through the process gas outlet line (24) by the outlet line blower (31).

2. The device (1) according to claim 1,
wherein the injector nozzle (19) is fluidically connected via a cooling gas line (20) to a cooling line blower (21).

3. The device (1) according to claim 1,
wherein the injector nozzle (19) is designed as a subsonic nozzle.

4. The device (1) according to claim 1,
wherein the process gas inlet line (6) has a cooling section (22) including a water-cooled cooling jacket.

5. The device (1) according to claim 1,
wherein the process gas inlet line (6) is arranged in a lower region of the wall (5).

6. The device (1) according to claim 1,
wherein the gas-permeable bottom area (9) of the scrap basket (7) is arched and comprises a plurality of circumferential slots (10) through which the process gas can be introduced into the scrap basket (7).

7. The device (1) according to claim 6,
wherein the slots (10) are formed by an arrangement of stacked sheets (11).

8. The device (1) according to claim 1,
wherein the scrap basket (7) comprises a flange (13) with a sealing collar (14) arranged at an outer lateral surface (12) of the scrap basket (7), and
wherein the sealing collar (14) corresponds to a sealing seat (15) of the receiving container (3) so that the receiving container (3) can be hermetically sealed with respect to the scrap basket (7).

9. The device (1) according to claim 8,
wherein the sealing seat (15) comprises a sand-filled annular channel.

10. The device (1) according to claim 1,
wherein the receiving container (3) has a support (17) on which the scrap basket (7) can be placed.

11. The device (1) according to claim 1,
wherein the receiving container (3) comprises a water pipe (18) through which condensed water that is accumulated during a drying process can be removed from the receiving container (3).

12. A method for drying and/or preheating scrap, comprising:
providing the device as in claim 1; and
admixing a cooling gas to the process gas via the injector nozzle (19) arranged coaxially in the process gas inlet line (6).

13. A metallurgical plant (2), comprising:
a melting furnace (26);
a post-combustion chamber (8) fluidically connected to the melting furnace (26) via a process gas exhaust line (27); and
the device (1) according to claim 1 fluidically connected to the post-combustion chamber (8) via the process gas inlet line (6).

14. The metallurgical plant (2) as in claim 13, further comprising
a treatment plant (29), the treatment plant (29) being fluidically connected to the post-combustion chamber (8) by
a process gas main line (28).

15. The metallurgical plant (2) as in claim 14, further comprising
a valve (30) arranged in the process gas inlet line (6) for selectively feeding a partial volume flow of the process gas from the post-combustion chamber (8) to the device (1) while feeding a major part of the process gas to the treatment plant (29).

16. The metallurgical plant (2) as in claim 14, wherein the melting furnace (26) is
an electric arc furnace (EAF).

17. The device (1) according to claim 1,
wherein the process gas inlet line (6) comprises a horizontal ring line with a plurality of connections via which the process gas is fed to the receiving container (3).

* * * * *